(12) United States Patent
Fuentes et al.

(10) Patent No.: US 9,210,941 B2
(45) Date of Patent: Dec. 15, 2015

(54) CONTINUOUS PROCESS FOR MAKING A PITA CHIP

(75) Inventors: Ximena Quintero Fuentes, Flower Mound, TX (US); Ponnattu Kurian Joseph, Irving, TX (US); Rogers Williams, McKinney, TX (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 354 days.

(21) Appl. No.: 13/016,585

(22) Filed: Jan. 28, 2011

(65) Prior Publication Data

US 2012/0196015 A1 Aug. 2, 2012

(51) Int. Cl.
*A21D 13/00* (2006.01)
*A23L 1/164* (2006.01)
*A21C 15/00* (2006.01)
*A21B 1/48* (2006.01)

(52) U.S. Cl.
CPC .............. *A21D 13/0074* (2013.01); *A21B 1/48* (2013.01); *A21C 15/00* (2013.01); *A23L 1/1646* (2013.01)

(58) Field of Classification Search
CPC ........... A21C 11/10; A21D 6/00; A21D 13/00
USPC ............... 426/473, 497, 549, 94, 523; 99/349
See application file for complete search history.

(56) References Cited

U.S. PATENT DOCUMENTS

| | | | |
|---|---|---|---|
| 4,202,911 A | | 5/1980 | Papantoniou |
| 4,218,480 A | * | 8/1980 | Dyson et al. .................... 426/19 |
| 5,968,566 A | * | 10/1999 | McDaniel et al. .............. 426/19 |
| 6,139,885 A | * | 10/2000 | Jouanneau et al. ............. 426/94 |
| 6,291,002 B1 | * | 9/2001 | Goglanian .................... 426/496 |
| 6,491,959 B1 | * | 12/2002 | Chiang et al. ................ 426/560 |
| 6,746,701 B2 | * | 6/2004 | Kashou et al. ................ 426/128 |
| 2002/0136814 A1 | * | 9/2002 | Forneck et al. ............... 426/549 |
| 2006/0236873 A1 | * | 10/2006 | Saunders et al. ................ 99/427 |
| 2007/0207240 A1 | | 9/2007 | Hansen |

OTHER PUBLICATIONS

Database Biosis [Online] Biosciences Information Service, Philadelphia, PA, US; Mar. 2001, Gupta T R: "Individual heat transfer modes during contact baking of Indian unleavened flat bread (chapati) in a continuous oven", XP002726229, Database accession No. PREV200100083972, 1 page.

Database FSTA [Online] International Food Information Service (IFIS), Frankfurt-Main, DE; Linko P. et al: "Production of flat bread by continuous extrusion cooking from high alpha -amylase flours.", XP002726230, Database accession No. FS-1984-12-M-1381, 2 pages.

(Continued)

*Primary Examiner* — Rena Dye
*Assistant Examiner* — Preston Smith
(74) *Attorney, Agent, or Firm* — Colin P. Cahoon; Stephen Y. Liu; Carstens & Cahoon, LLP

(57) ABSTRACT

A continuous process for making a pita chip or other similar products using a continuous pressing step that occurs shortly after a continuous oven initial cooking step. Applicants' invention produces a final product with characteristics of a traditionally cooked pita chip using equipment that provides for significant increases in manufacturing throughput. The use of a continuous oven with the relatively concurrent pressing step allows for the production of a flat chip piece on a continuous product line.

15 Claims, 5 Drawing Sheets

(56) References Cited

OTHER PUBLICATIONS

Gupta T R: "Individual heat transfer modes during contact baking of Indian unleavened flat bread (chapati) in a continuous oven", J. Food Engineering, vol. 47, No. 4, Mar. 2001, pp. 313-319, ISSN: 0260-8774, 7 pages.

J. Cereal Science, vol. 2, No. 1, Dec. 30 1984, pp. 43-51, Linko, P. Production of Flat Bread by Continuous Extrusion Cooking from High x-Amylase Flours, Helsinki University of Technology, 8 pages.

Extended European Search Report for EP Application No. 12738861.9 dated Jul. 15, 2014, 10 pages.

* cited by examiner

US 9,210,941 B2

CONTINUOUS PROCESS FOR MAKING A PITA CHIP

BACKGROUND OF THE INVENTION

1. Technical Field

The present invention relates to a method for making a pita chip or crisp and other such products in a continuous sheeting operation. Specifically, the process involves cutting a sheeted dough into longitudinal strips, cooking these longitudinal strips to form tubes, and pressing these tubes with a nub press prior to cutting and finish cooking.

2. Description of Related Art

Pita bread is a type of flatbread typically a round pocket bread, believed to have originated in the Middle East. The baking process typically involves forming, by rolling, a flat dough disk that is baked in a hot oven, usually in excess of 500° F., on a flat support surface. The "pocket" inside the finished loaf is created during cooking when the outside layers of the bread are seared, thus forming a cap that impedes the release of steam from the interior of the bread. This trapped steam puffs up the dough in the middle of the bread forming a pocket. As the bread cools and flattens, a pocket is left in the middle that can be later stuffed for making sandwiches and the like.

Pita "chips" or "crisps" (these two terms are used interchangeably herein) can be made by cutting or chopping pita bread loaves into chip sized pieces. Making individual round pita bread loaves and cutting each loaf into chip sized pieces can be time consuming and is not conducive to an efficient, continuous operation. One prior art approach to this issue involves pressing a dough ball between two hot plates to form the pita loaf and then cutting the loaf into smaller chip sizes. This approach is referred to as a dough ball press method followed by chopping of the bread loaves. The dough ball press method is not particularly efficient and has not demonstrated desirable throughput rates on continuous or semi-continuous product lines.

One attempt at developing a continuous process that makes pita chips or crisps more efficiently than the dough ball press method can be found in U.S. Pat. No. 6,291,002 entitled "Method for Preparing Elongated Pita Bread" issued on Sep. 18, 2001, to inventor George Goglanian (the "Goglanian Patent"). The Goglanian Patent describes a process whereby dough is sheeted and then cut longitudinally into continuous strips. These strips are run through an oven, thereby producing a tube-shaped bread product. A tube shape, however, is not conducive to making into a flat chip, because cutting the resultant tube would yield shorter tube segments as opposed to flat chips. Consequently, the Goglanian Patent teaches cutting this tube along its longitudinal edges into two sections, a top section and a bottom section. When these sections are cut into chip shapes, the sections fall away from each other, thus making chips of both the top and the bottom of the tube.

The process described in the Goglanian Patent produces a pita chip or crisp with only one side having the characteristic pita bread exterior texture. The other side of the chip comprises the interior of the cooked tube and, therefore, presents a different texture than the outside surface. Further the Goglanian Patent requires the cutting step that separates the top half of the tube from the bottom half of the tube. This step requires special cutting equipment and leads to product loss during the cutting itself. While the Goglanian Patent can produce a chip from flatbread, it does not produce the pita chip similar to one made by chopping or cutting a round pita bread loaf.

Consequently, a need exists for a continuous pita chip process, along with the accompanying equipment, that can efficiently produce a pita chip having the exterior pita texture on both sides of the chip such that it resembles a pita chip made by cutting a traditional pita bread loaf. Such process should be capable of throughput rates typical of sheeter lines and, preferably, use equipment which provides for a minimal plant footprint.

SUMMARY OF THE INVENTION

In a preferred embodiment the invention mixes raw ingredients to produce a sheetable dough. In one embodiment, the dough is then subjected to a low stress sheeting step followed by a proofing step. After the dough is proofed it is cut, for example into longitudinal strips, and then proceeds continuously to a pita oven for cooking. Shortly after exiting the oven the cooked dough, now in a tube shape, is run through a nub press, which in a preferred embodiment is a pin roller. After this pressing step, the product is allowed to cool, is cut into chip shaped pieces, and is further cooked and seasoned prior to packaging.

The invention provides for a continuous process that produces a pita chip or crisp that resembles a pita chip made by cutting a traditional pita bread loaf into chips. Yet, such process provides for substantially increased throughput and minimal plant footprint.

BRIEF DESCRIPTION OF THE DRAWINGS

The novel features believed characteristic of the invention are set forth in the appended claims. The invention itself, however, as well as a preferred embodiment, further objectives and advantages thereof, will be best understood by reference to the following detailed description of illustrative embodiments when read in conjunction with the accompanying drawings, wherein:

DETAILED DESCRIPTION

Figure 1:
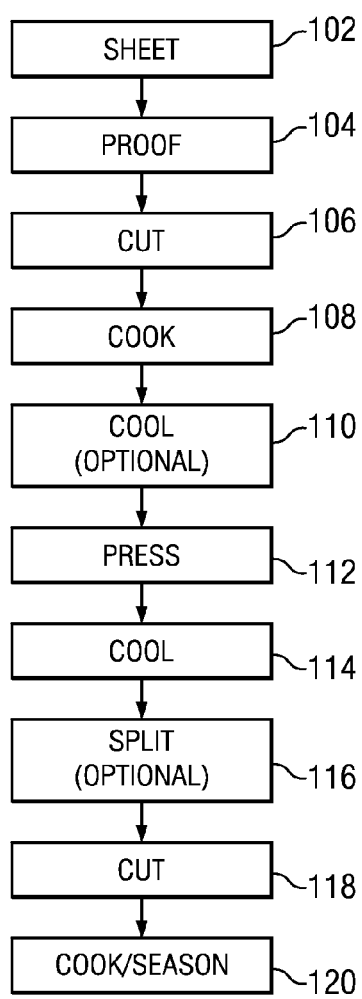
FIG. 1 is flowchart of Applicants' method for making pita chips.

Referring to FIG. 1, Applicants' process starts with sheeting of a dough during a sheeting step 102. In a preferred embodiment, this sheeting step 102 is a low-stress sheeting operation, typically involving two or more sheeter roller pairs, such that the thickness of the sheet is gradually reduced, thereby limiting the work imparted to the dough by the sheeters. In one embodiment, the dough sheet is sheeted 102 to a final thickness of approximately 0.0625 (1/16) inches to 0.1875 (3/16) inches. This dough sheet then continues down a conveyor system through a proofing step 104, typically involving a proofer box or proofer.

A proofer is a type of food processing equipment that allows the dough to rise in a relatively warm and humid environment for a period of time before further processing. Proofing relaxes the stress in the dough and lets the yeast work. A proofer box is a chamber that is humidity and temperature controlled, for example at around 90° F. and about 50% relative humidity. The proofing time using Applicants' invention varies between zero minutes to twenty minutes, depending upon the amount of flour in the dough, the amount of yeast in the dough, and the preferred texture of the end product. For example, a softer textured product requires a longer proofing time than a harder textured product.

After exiting the proofer at the proofing step 104, the dough continues down a conveyor through a continuous cutter at a cutting step 106. In a preferred embodiment, this cutter cuts the dough into continuous longitudinal flat strips. However, the cutter can also make shapes other than longitudinal flat strips, such as longitudinal hexagonal shapes and longitudinal round shapes. In an alternative embodiment, the cutting step 106 can occur prior to the proofing step 104.

Figure 3:
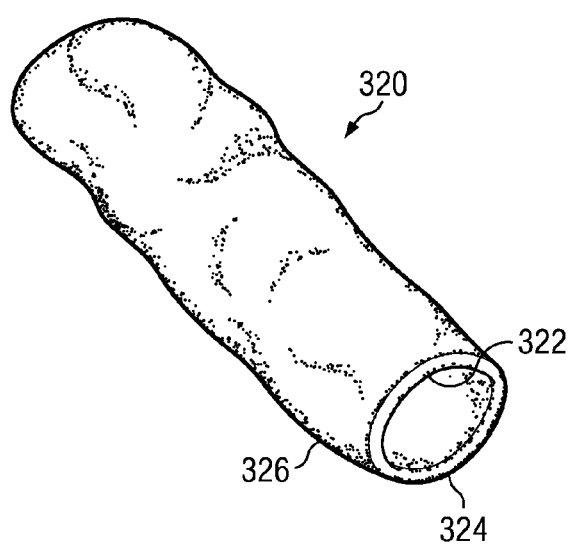
FIG. 3 is a perspective view of a portion of one of the dough tubes of FIG. 2.
Figure 2:
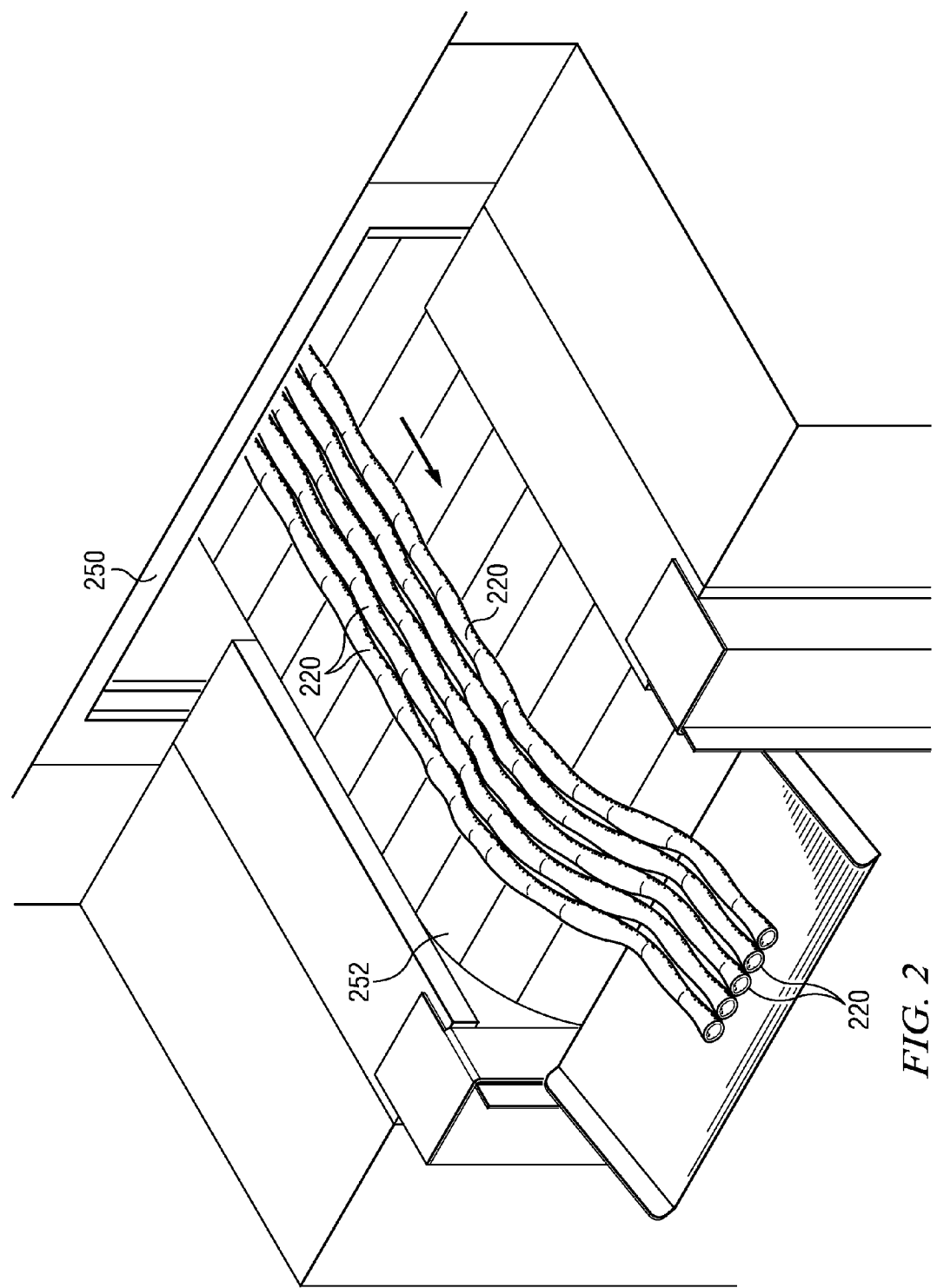
FIG. 2 illustrates cooked dough tubes exiting a pita oven as a part of Applicants' method.

The continuous longitudinal strips formed by the cutting step 106 continue along a conveyor and are spread apart by a spreading conveyor in order to input small gaps between the strips prior to entering a continuous pita oven where it is cooked during a cooking step 108. These small gaps assure that the strip doesn't join back together during cooking 108. In a preferred embodiment, the pita oven is a two zone oven set at 850° F. and 575° F. for zones 1 and 2, respectively, for a dwell time, in a preferred embodiment, of between six and thirty seconds, depending on product thickness and heat intensity. During this cooking step 108, the longitudinal strips puff up, thereby forming a cavity in the center of each strip, as can be seen in FIG. 3, resulting in tube-like longitudinal strips (or hollow ropes) exiting the pita oven, as can be seen in FIG. 2.

Returning to FIG. 1, after the cooking step 108, these longitudinal tubes can be subjected to an optional cooling step 110 varying from zero seconds to fifteen seconds depending on the line speed required to achieve the desired texture and shape of the end product. For example, eliminating the cooling step 110 results in a harder product than conducting a cooling step 110 of up to fifteen seconds.

After the cooling step 110, the longitudinal tubes are subjected to a pressing step 112. In a preferred embodiment, this involves a nub press or pin roller, as will be described in more detail in reference to FIGS. 6a, 6b, and 6c. This pin roller presses the interior surfaces of the tube together. Because this pressing step 112 occurs very shortly after the cooking step 108, the dough inside the longitudinal tube is still somewhat pliable and tacky. Consequently, the pressing step 112 generally flattens the tube such that the inner surfaces of the pocket adhere in places, thereby forming a relatively flat, double layered product resembling a standard pita flatbread in its cross-section, but without the completely open pocket.

After the pressing step 112 this now generally flattened longitudinal strip is subjected to a second cooling step 114 that varies in time from zero to thirty seconds, depending on the cooling conditions and desired end product, prior to cutting into snack size pieces.

If a single layered pita chip resembling that described in relation to the Goglanian Patent is desired, the flattened tube is next subjected to a splitting step 116. This splitting step 116 separates the flattened tube into a top and bottom strip. This step 116 is listed as optional, as the preferred embodiment maintains the upper and lower portions in contact to thus later form a food piece having two layers.

Figure 4:
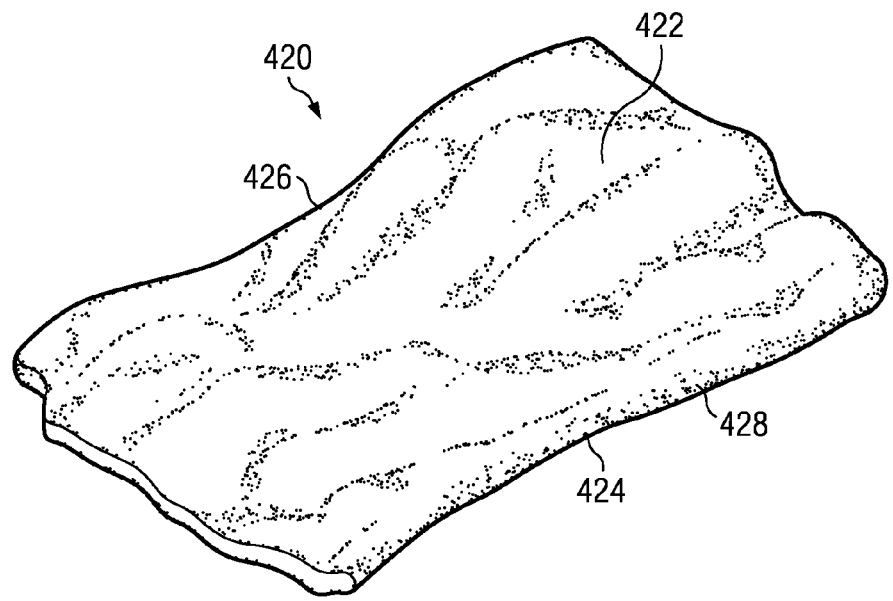
FIG. 4 is a perspective view of a chip produced by Applicants' invention.

The flattened longitudinal strip is next cut in a cutting step 118 by, for example, a cutting roller that forms individual chip-sized pieces, such as is illustrated in reference to FIG. 4. Finally, and again in reference to FIG. 1, these individual pieces are finish cooked and seasoned 120 prior to packaging.

Each of the individual steps described in general with reference to FIG. 1 will now be described in more specific detail in relation to a preferred embodiment of Applicants' invention.

Table 1 below shows the dough formula used to produce a pita chip in accordance with this preferred embodiment.

TABLE 1

| Ingredient | Weight Percentage |
| --- | --- |
| Wheat Flour | 30-62 |
| Whole Wheat Flour | 0-31 |
| White Whole Wheat Flour | 1-2 |
| Sugar | 1-2 |
| Salt | 0-2 |
| Oat Fiber | 0-1 |
| Yeast | 1 |
| Actual water | 32-34 |

The raw ingredients listed in Table 1 are first fixed mixed to hydration in order to form a pliable dough. This can be done, for example, by a triple roller horizontal bar mixer. A typical mix time is between two and six minutes to a dough temperature of about 82° F. to 90° F.

Once the dough is formed, it is fed into a sheeter. The preferred sheeter utilizes three sets of sheeting rollers in order to progressively sheet 102 to a thinner sheet thickness while imparting a minimum amount of work into the dough during the process. A final sheet thickness of between 1/16 inch and 3/16 inch is preferred given the ingredients for the dough listed in Table 1.

The proofing step 104 is a continuous step that mimics the static resting of the dough in an environment with a constant temperature and humidity. This is accomplished by the use of a proofer box such as a continuous proofer with humidity and temperature control, which is a cascading multi-tier proofer designed to process a continuous dough sheet. Preferably, the proofer box used with Applicants' invention is maintained at a temperature of between 75° F. and 95° F. and a humidity level of between 45% and 65%. More preferably, the temperature inside the proofer is about 85° F. and about 55% humidity. The dwell time during the proofing step 106 is adjusted depending on the composition of the dough admix and the preferred texture of the end product. In relation to the dough composition disclosed in FIG. 1, the dwell time in the proofer preferably ranges between one minute and fifteen minutes. Applicants most preferred embodiment using the dough described in Table 1 involves a proofing step at 85° F. and 55% humidity for a period of about eight minutes.

After exiting the proofer, the dough is subjected to a cutting step 106, preferably cut into longitudinal strips that are 1.25 inches wide. As noted previously, the cutting step 106 can optionally occur prior to the proofing step 104. After the cutting 106, the longitudinal strips are slightly separated by a spreading conveyor in order to maintain some distance between each longitudinal strip as they proceed through the next step, the cooking step 108. A gap of 0.125 inches is accomplished by the spreading conveyor in a preferred embodiment, but other distances are acceptable as long as the strips are not touching each other at their lateral edges.

Referring again to the dough made by the ingredients listed in Table 1, Applicants' preferred embodiment involves a continuous infrared oven with radiant, connective and conductive heat from both the top and bottom sides of the product conveyor. It is preferred to subject the dough made by the ingredients of Table 1 to a temperature of greater than 500° F. for a dwell time during the cooking step 108 of less than one minute. Doing so sears the exterior of the longitudinal dough strips causing capping layers on the exterior of the strips and a continuous cavity to form inside the strips. This makes the dough strips into partially-cooked bread tubes or hollow ropes. This can best be understood with reference to FIGS. 2 and 3. In a preferred embodiment a two zone oven is used with temperature settings of 850° F. and 575° F. in zones 1 and 2, respectively, for a dwell time of between ten and fifteen seconds or, more preferably, about 12.7 seconds.

It should be noted that the cooking step 108 is only a partial cooking of the dough. In a preferred embodiment, the dough enters the oven at 42% water by weight and exits the oven at 32% water by weight, thereby reducing the moisture level of the dough during the cooking step 108 by less than 11%. The strips as they exit the oven are still pliable and somewhat tacky on the inside.

Referring to FIG. 2, several of these bread tubes 220 are shown exiting the oven 250 immediately after the cooking step by way of a conveyor 252. A perspective view of a cross-sectional portion of one of these tubes 220 is shown in FIG. 3 as a tube piece 320. By viewing the piece 320 in cross-section, it can be seen that a cavity has formed between the upper layer 322 and the lower layer 324. Also shown is one of the lateral edges 326.

Returning to FIG. 1, Applicants' method can incorporate an optional cooling step 110 depending on the environmental temperature and line speed. If a tube 220 is pressed together while the product is too hot, the interior cavity can be joined back together, so to speak, making the finished product harder. The cooler the product before pressing, the less bonding spots and the softer the finished product.

Figure 5:
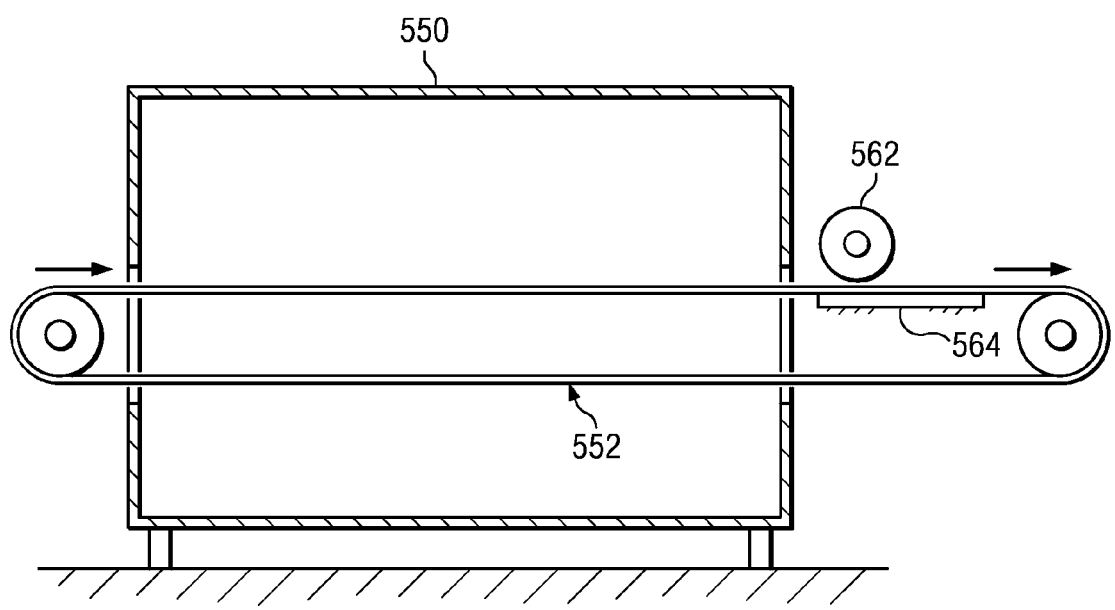
FIG. 5 is a schematic of one embodiment of Applicants' oven and press combination.

It should be noted that the cooling step 110 is, in any event, relatively short such that the partially cooked bread tubes are not allowed to set up or harden in the shape illustrated by both FIGS. 2 and 3. Instead, the tubes are either immediately or within a short period of time after the cooking step 108, and certainly no more than 15 seconds thereafter, subjected to the pressing step 112. It is preferred that the internal temperature of the dough tube at the time of the pressing step 112 should be at least 140° F. and preferably of between 140° F. and 210° F. The purpose of this pressing step 112 is to collapse the tube and reform these continuous ropes into flat longitudinal strips. This is accomplished, in a preferred embodiment, by a device referred to as a nub press or pin roller. A nub press is a flat plate having protrusions or nubs that are periodically pressed onto the passing partially cooked bread tubes. A more preferable embodiment uses a pin roller such as illustrated in FIG. 6. A pin roller is a cylindrical roller with protruding pins. Ideally, and as it is illustrated in FIG. 5, this pin roller 562 is located in close proximity to the exit of the pita oven 550 such that the bread ropes or tubes that exit the oven 550 on the conveyor belt 552 are shortly thereafter subjected to the previously described pressing step. This pressing step, in a preferred embodiment, occurs continuously with the tubes proceeding along the conveyor 522 to be pressed between the pin roller 562 and a support plate 564. Thereafter, the flattened strips continue along the direction indicated on the conveyor 552 to the next processing step.

Figure 6A:
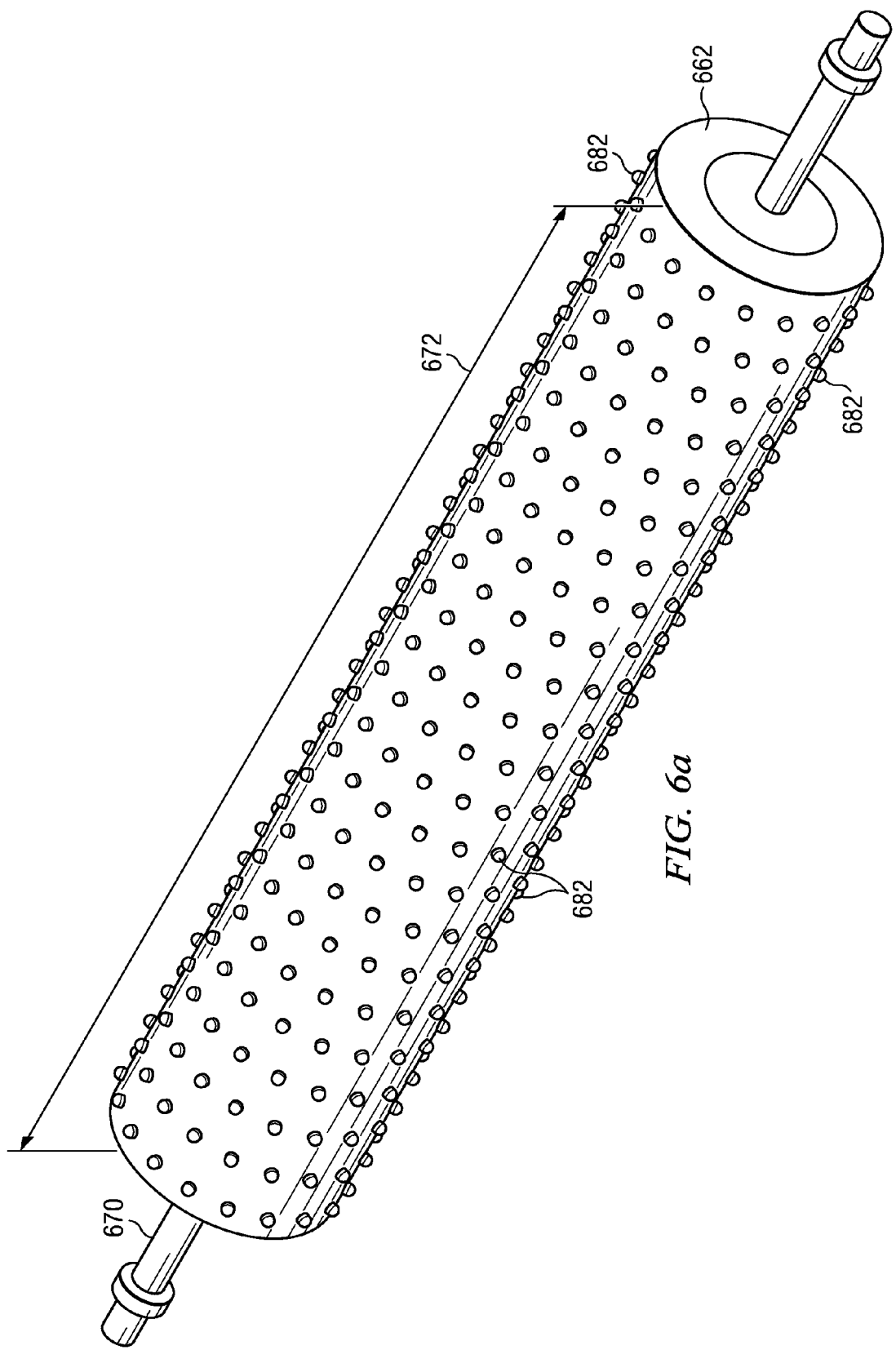
FIGS. 6a, 6b, and 6c illustrate a preferred embodiment nub press pin roller of Applicants' invention.
Figure 6B:
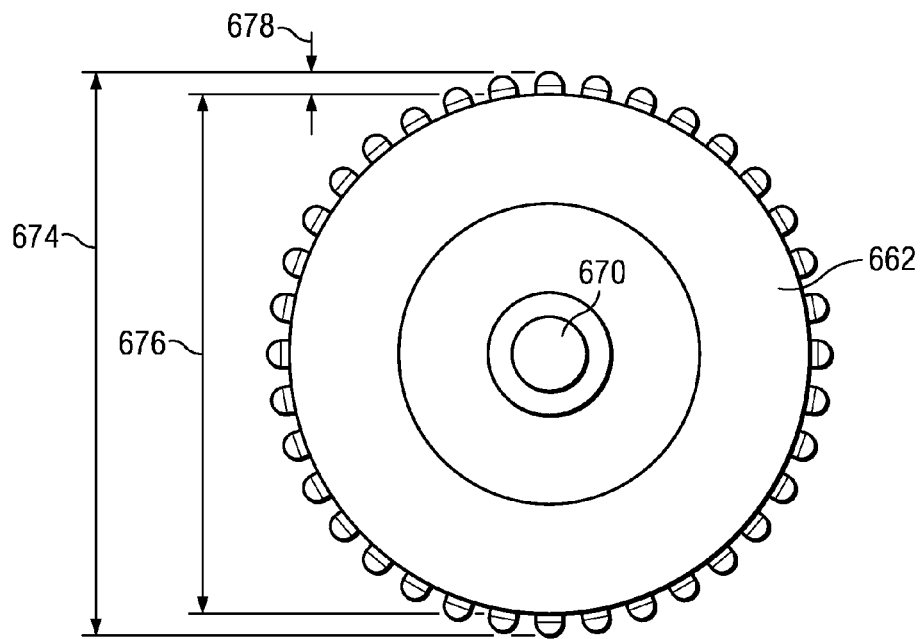
Figure 6C:
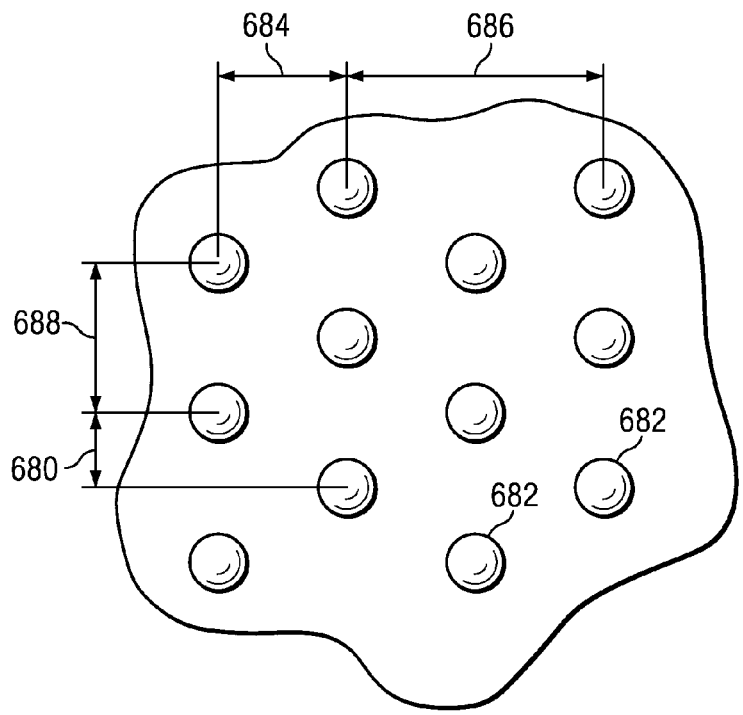

Referring now to FIGS. 6a, 6b, and 6c, a pin roller 662 is illustrated. FIG. 6a shows a perspective view in elevation of the pin roller 662. The pin roller 662 is mounted on a shaft 670. The pin roller 662 consists of a curved surface interspersed with raised pins 682. The pin roller 662 illustrated has an overall tube length 672 of 20.0 inches or 508 mm. Referring to FIG. 6b, which is a side view of the pin roller 662 mounted on the shaft 670, the height or outside diameter 676 of the tube 662 (not taking into account the pins 682) is 5.229 inches or 133 mm. Taking into account the pins 682, the over diameter 674 of the pin roller 662 is 5.729 inches or 146 mm. In the embodiment illustrated, the height of each individual pin 682 from the tube surface of the pin roller 662 is 0.250 inches or about 6 mm. Further, the roller is spaced from the conveyor surface such that the end of the pins 682 are 1/16 inch away from the conveyor surface at the closest point.

FIG. 6c is a cut away section of the pin roller surface flattened in order to illustrate the relative distance between the pins 682 and the pattern used. It can be seen that the pins 682 are arranged in a triangular pattern resulting in a series of vertical and horizontal rows. FIG. 6c is oriented such that the horizontal rows of pins 682 are parallel to the shaft 670 and the vertical row of pins 682 are perpendicular to the shaft 670. The vertical distance 688 between pins 682 in vertical rows is 1.0 inches or 25 mm, while the vertical distance 680 as between pins 682 in adjacent vertical rows is 0.50 inches or 13 mm. The horizontal distance 684 between adjacent vertical rows is 0.866 inches or 22 mm, while the horizontal distance 686 between two vertical rows separated by a third vertical row is 1.7320 inches or 44 mm. The roller 662 depicted, therefore, is 23 pins wide and 18 pins around. Each pin 682 has a spherical radius of 0.188 inches.

The pins 682 illustrated in FIGS. 6a, 6b, and 6c provide for points of increased pressure along the bread tube during the pressing step. For a dough thickness out of the sheeter of about 3/32 inch, a press gap of 1/16 inch is preferred in order to impart the desired structure for a pita chip end product. The pressing with a nub press or pin roller of such configuration is preferable because it allows for a continuous process, providing controlled contact or press points without completely flattening the strips, which in turn contributes to the textural characteristics of the end product. The triangular pattern center of 1 inch is optimized for the thickness of the product to manage the span between the attachment points to minimize breakage. This varies depending on product thickness and strength.

Returning again to FIG. 1, after the pressing step 112 is accomplished, the now flattened and partially cooked strips continue along a conveyor and are allowed to cool, typically in ambient conditions, for between 12 minutes and 20 minutes. Referring again to the dough formulation listed in Table 1, is it preferable for the formation of a pita chip that the dough be allowed to cool at this cooling step 114 for approximately 15 minutes.

If it is desirable to produce a pita chip wherein one side of the chip is characteristic of the outside surface of a pita and the other side of the chip is characteristic of the inside surface of the pita pocket, Applicants' invention can optionally employ a splitting step 116 that involves splitting the piece along its lateral edges. This can be done, by example, with a modified band saw typically used for cutting bread. In a preferred embodiment, however, the flattened strips proceed to a cutting step 118, typically involving a cutting roller, that can cut the strips into chip sized shapes, such as rectangular shapes or triangular shapes. A rectangular shaped chip is illustrated in FIG. 4, which shows a pita chip 420 with an upper surface 422, a lower surface 424, and two lateral edges 426, 428. It can be seen that this end product 420 exhibits an undulating exterior surface. The interior surface also maintains variations in the distance between the two distinct layers of the chip 120 produced by the process, such that in places the layers are physically connected and in other are separated slightly by small pockets of between 0.5 mm and 2.0 mm in height, for example.

After cutting the strips to form the chips 420 shown in FIG. 4, the chips 420 are finished cooked and seasoned. This finish cooking can involve convection baking, hot air drying, microwave cooking, frying, or other finish cook methods known in the art in order to lower the end product moisture level to a desired end point. In a preferred embodiment, the moisture level is lowered to between 3% and 1% by weight. Thereafter, the finished product is packaged by methods known in the art.

Table 2 below shows the composition of a finished product in accordance with one embodiment of Applicants' invention. The ingredients are listed by weight percentage of the finished crisp.

TABLE 2

| Finished Product Composition | Percentage |
|---|---|
| Wheat Flour | 73.3 |
| Salt | 2.4 |
| Sugar | 1.8 |
| Yeast | 2.8 |
| Oat Fiber | 0.9 |
| Vegetable Oil | 17.4 |
| Water | 1.4 |

It should be noted that the entire process described as Applicants' preferred embodiment involves the continuous movement of the dough or product starting from the sheeting step through the finish cooking and seasoning step. The process is intended to take place using conveyors along with equipment that accommodates the continuous operation of each of the steps described. This allows for the continuous production of a flat bread type product without the need for the use of the dough ball and hot press equipment used in prior art. Equipment used in this continuous process is said to be 'in communication,' because dough and/or product moves continuously from one piece of equipment (such as sheeter, proofer, oven, press, etc.) to the next piece of equipment.

Further, while Applicants' invention has been described with reference to a pita chip embodiment, the processing steps and equipment used with Applicants' invention and described herein are equally adaptable for producing any number of types of flat bread products on a continuous processing line, including crackers. Adjustments can be made to the initial dough composition and various processing parameters, including cooling times, oven temperatures, dwell times at various stages, and temperature and humidity during the proofing stage, to produce flat bread products of varying types and consistencies. For example, a differential speed in conveyors of 2:1 can be used between the proofing step and oven to create a cracker like texture in the final product by stretching the dough before cooking. It should be understood that Applicants' invention can substitute for the prior art dough ball and hot press method and equipment in order to produce any type of flat bread, such as the East Indian Naan bread, previously made by prior art methods but with the efficiencies and throughput of a continuous process.

While the invention has been particularly shown and described with reference to a preferred embodiment, it will be understood by those skilled in the art that various changes in form and detail may be made therein without departing from the spirit and scope of the invention.

What is claimed is:

1. A method for making a flat bread product, said method comprising the steps of:
   a) mixing wheat flour with water to form a dough;
   b) sheeting said dough;
   c) cutting said dough into continuous strips of dough;
   d) cooking said continuous strips of dough, wherein said cooking occurs in a continuous oven, thereby producing tubes of cooked product; and
   e) pressing said tubes of cooked product within a time after the cooking of step d), thereby producing a double layered flat bread product;
   f) further cooking the double layered flat bread product of step e) to reduce a first moisture content of the flatbread product from about 32% to a second moisture content between 1-3%.

2. The method of claim 1 wherein the double layered flat bread product of step e) is cut into a plurality of pieces prior to the cooking of step f).

3. The method of claim 1 wherein the cooking of step d) comprises an oven temperature of at least 500° F. and a dwell time in the oven of less than one minute.

4. The method of claim 3 wherein the pressing of step e) occurs while the cooked product has an internal temperature of at least 140° F.

5. The method of claim 3 wherein the pressing of step e) occurs while the cooked product has an internal temperature of between 140° F. and 210° F.

6. The method of claim 1 wherein the pressing of step e) occurs within 15 seconds for the cooking of step d).

7. The method of claim 1 wherein the cooking of step d) results in a moisture loss by weight in the dough of less than 11%.

8. The method of claim 1 wherein the pressing of step e) comprises pressing with a nub press.

9. The method of claim 1 wherein the pressing of step e) comprises a pin roller.

10. The method of claim 2 wherein the flat bread product produced by step f) consists of a pita chip.

11. A method for making a food piece, said method comprising:
    a) forming a flour based dough;
    b) sheeting said dough;
    c) cutting said dough into continuous strips of dough;
    d) cooking said continuous strips of dough in a continuous oven thereby producing cooked continuous strips of dough;
    e) pressing said cooked continuous strips of dough within 15 seconds of the cooking step d) to produce double layered pressed strips; and
    f) cutting said pressed strips into food pieces
    g) finish cooking after step f) to reduce a first moisture content of said food pieces from about 32% to a second moisture content between 1-3%.

12. The method of claim 11 wherein the cooking of step d) comprises a dwell time in the oven of less than one minute at a temperature of at least 500° F., and results in a moisture loss by weight in the dough of less than 11%.

13. The method of claim 11 wherein the pressing of step e) occurs while the cooked strip has an internal temperature of at least 140° F.

14. The method of claim 11 wherein the pressing of step e) occurs while the cooked strip has an internal temperature of between 140° F. and 210° F.

15. The method of claim 11 wherein the pressing step e) utilizes a pin roller.

* * * * *